Figure 1:
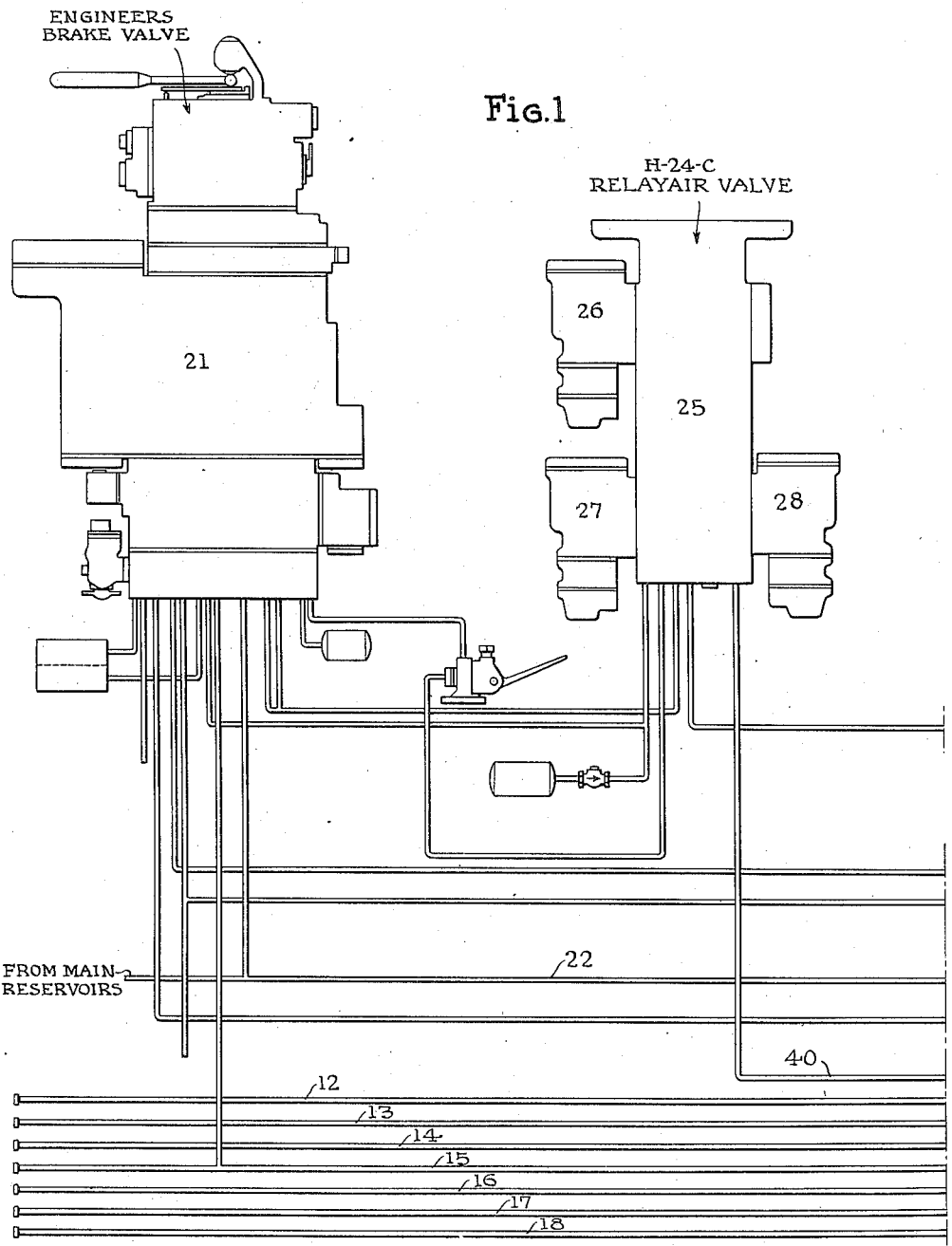

Feb. 6, 1951  J. VAN V. ELSWORTH  2,540,078
MULTIPLE UNIT LOCOMOTIVE BRAKE WITH RELEASE SIGNAL
Filed Dec. 5, 1949  7 Sheets-Sheet 7

Inventor
John V. V. Elsworth
By Dodge and Imo
Attorneys

Patented Feb. 6, 1951

2,540,078

UNITED STATES PATENT OFFICE 2,540,078

MULTIPLE UNIT LOCOMOTIVE BRAKE WITH RELEASE SIGNAL

John Van Varick Elsworth, Watertown, N. Y., assignor to The New York Air Brake Company, a corporation of New Jersey Application December 5, 1949, Serial No. 131,100

9 Claims. (Cl. 303—1)

This invention relates to air brakes and particularly to a system in which certain pipes forming normal parts of the brake system are so inter-related as to indicate to the engineer whether or not the brakes have completely released in response to a particular manipulation of the independent brake valve.

Multiple unit Diesel locomotives now in extensive use have commonly about seven air pipes which extend the length of the locomotive and are connected from unit to unit. There are also various electric and other connections. Since, under certain conditions, there is a tendency for slow release of brake cylinders to occur, particularly on locomotive units other than the leading one, there is need for a release indicator. From an operating standpoint, additional pipe or wire connections between units are so seriously objectionable as to inhibit recourse to even simple signal systems dependent on the use of a special signal pipe or signal wire.

This situation led applicant to investigate the possibility of using pipes forming part of the brake system to afford inter-unit connections which could be availed of under the release conditions in question to transmit some form of signal. The present invention is the result.

Stated in its simplest terms, the well known 24–RL system here taken as typical includes an "application and release pipe" and an "actuating pipe" each of which extends the length of the locomotive and is connected between units. The brake system, of course, includes one or more main reservoirs and a plurality of brake cylinders.

During releases effected by depressing the handle of the independent brake valve, the actuating pipe which leads to the independent brake valve is temporarily charged to actuate the release pistons in the control valves and is then vented upon rise of the handle. According to the invention, a valve, which opens in response to brake cylinder pressure, feeds main reservoir air to the actuating pipe at a rate so restricted as to have no effect on the release pistons. The escape of this air at the independent brake valve can be caused to serve as or operate an audible signal, or a visible signal can be arranged to respond to the flow.

This flow should not occur when the locomotive is standing with the independent brake applied, and the restricted flow is then arrested by a stop valve which closes in response to pressure then existing in the application and release pipe. Main reservoir is used as the source of air because its pressure is relatively stable, but any available source could be made to serve.

The mechanism added to the brake system comprises, in each unit, two pressure-responsive stop-valves in series, controlling flow from any available source, such as the main reservoir, through a choke to the actuating pipe. One of said valves is normally closed and opens in response to the existence of brake cylinder pressure and the other is normally open and closes when pressure exists in the application and release pipe. Some signal operable by the air flow through the actuating pipe is located on the leading unit near the independent brake valve.

The invention has a useful function in addition to the signaling action. Whenever an application is made by means other than the independent brake valve, applicant's device feeds air to the actuating pipe at a rate such that the actuating pipe becomes ineffectually charged. The term "ineffectually charged" here means that the pipe is charged to a pressure lower than that necessary to operate the release pistons of the control valves. This charge levels off throughout the length of the actuating pipe and if the handle of the independent brake valve is then depressed, to release the locomotive brakes without releasing the train brakes, the actuating pipe is already partly charged, so that the release pistons are moved sooner and more nearly synchronously than otherwise they would be.

In the 24–RL brake as presently built, the independent brake valve handle can be depressed for either of two purposes, (1) to prevent the locomotive brakes from applying at a time when the train brakes are being applied by the engineer's brake valve, and (2) to release the locomotive brakes after they have been applied by the engineer's brake valve, and without releasing the train brakes.

The depression of the handle has the effect of charging the actuating pipe. Consequently, the whistle or other signal attached to this pipe operates when the handle is depressed. On a train equipped according to the invention if the signal continues to function after the handle of the independent valve is allowed to rise, it indicates that the brakes have not completely released. Depression of the handle may, for example, have released brakes on the first unit or in the first and second units while brakes remained applied on other units of the locomotive. It is this condition which the present invention brings to the engineer's attention, the result being attained without the addition of any inter-unit connections.

A preferred embodiment of the invention will now be described by reference to the accompanying drawings, in which:

Figs. 1 to 7 inclusive, when assembled from left to right in the order of the figure numbers, produce a diagram of the braking system of a three-unit locomotive with the invention applied. Certain components are shown in elevation and certain other components are shown wholly or partially in section.

The drawings are basically a simplified version of Plate A–1 and Plate J of Instruction Pamphlet No. 59, published May, 1948, by The New York Air Brake Company and entitled "No. 24–RL Brake Equipment," but with the invention added. A copy of that pamphlet is filed with this application.

Figure 2:
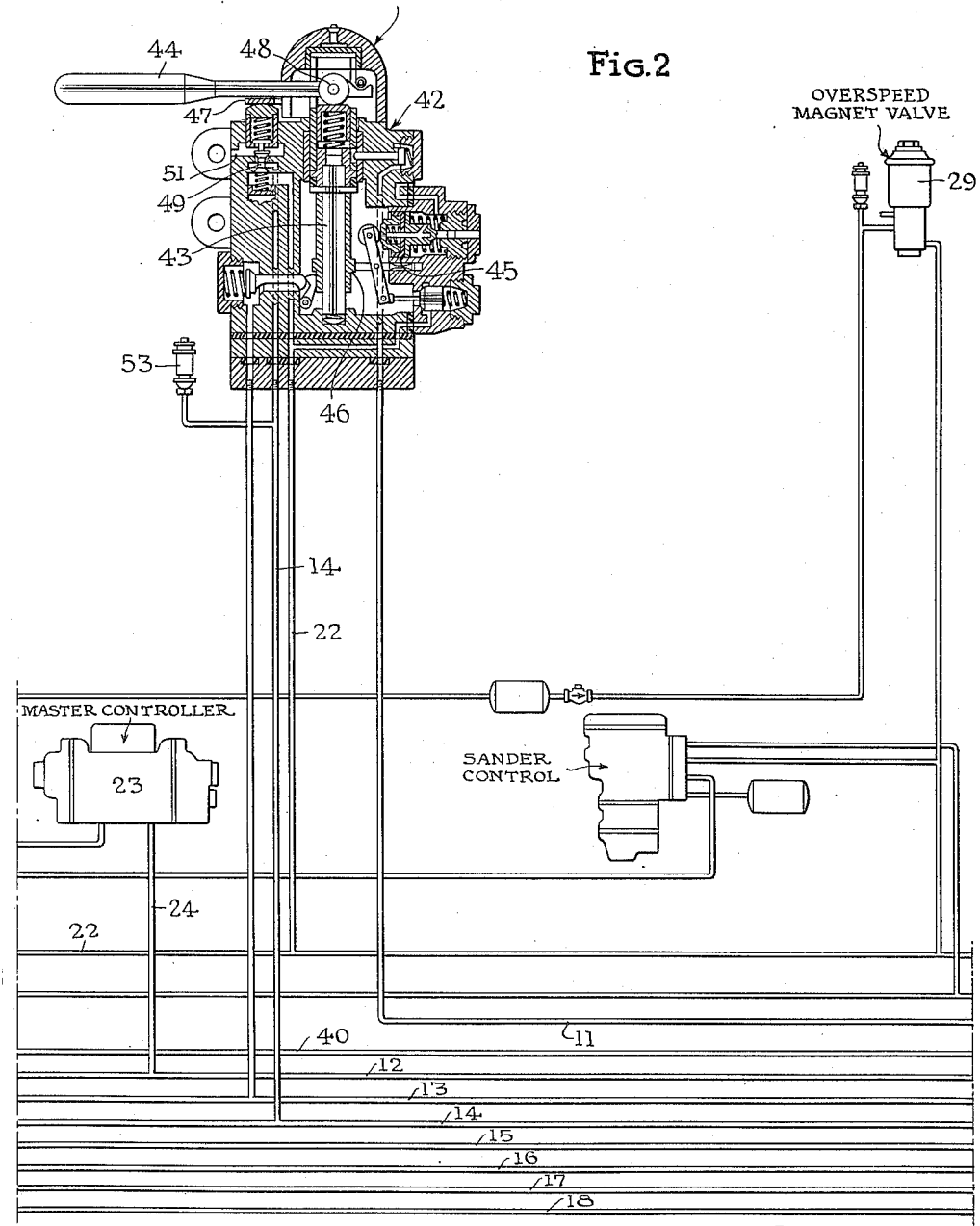
Figure 3:
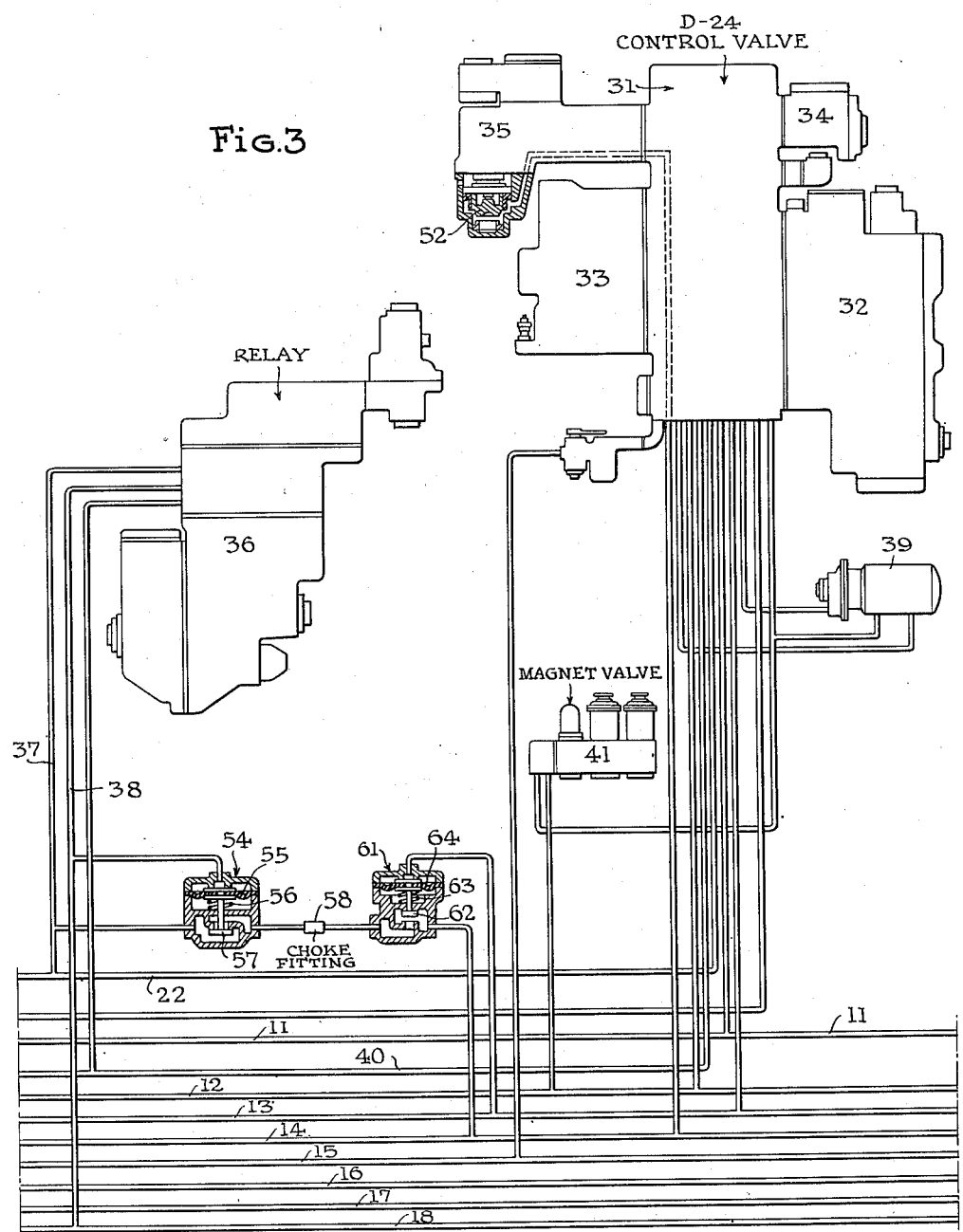
Figure 4:
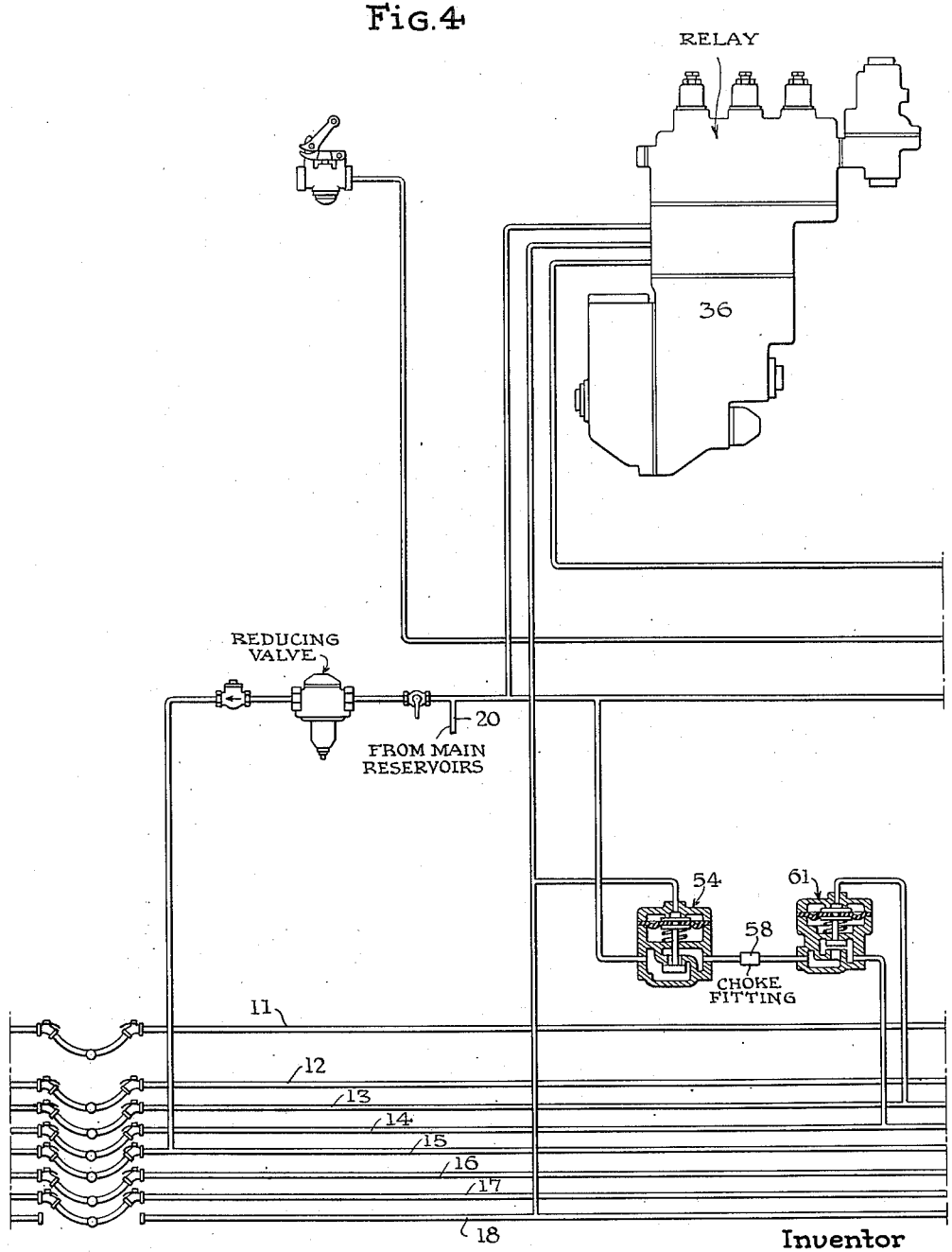
Figure 5:
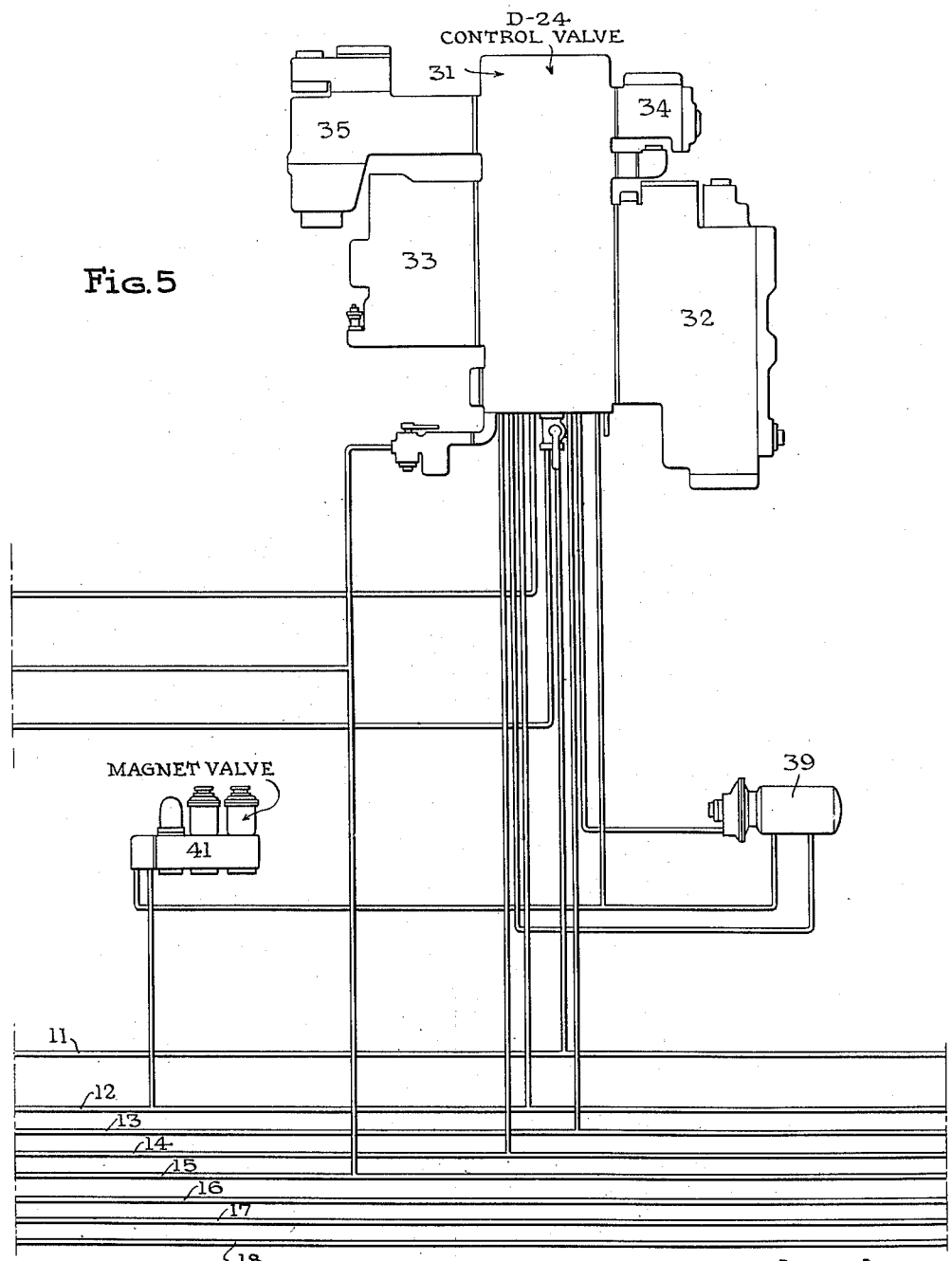
Figure 6:
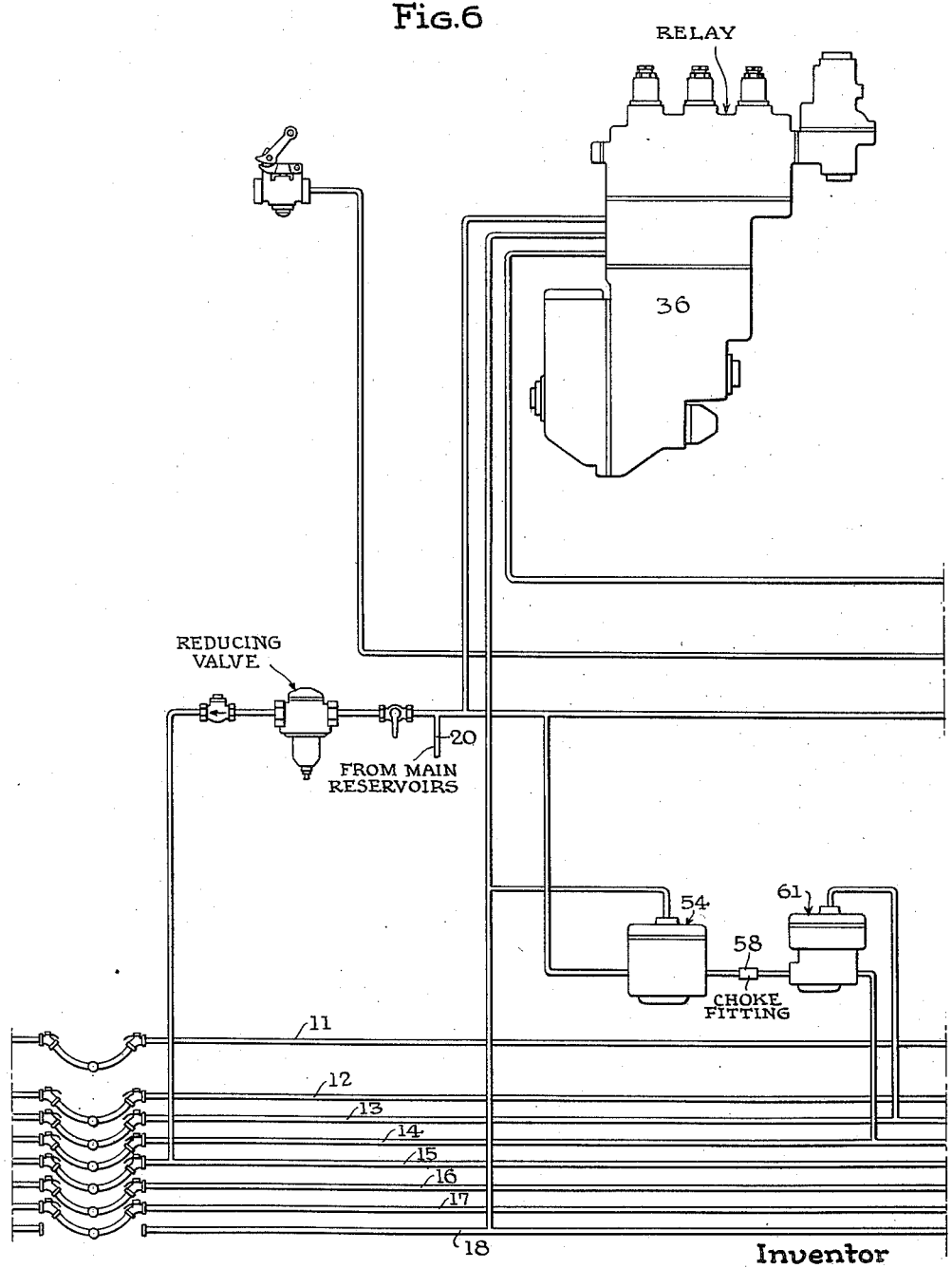
Figure 7:
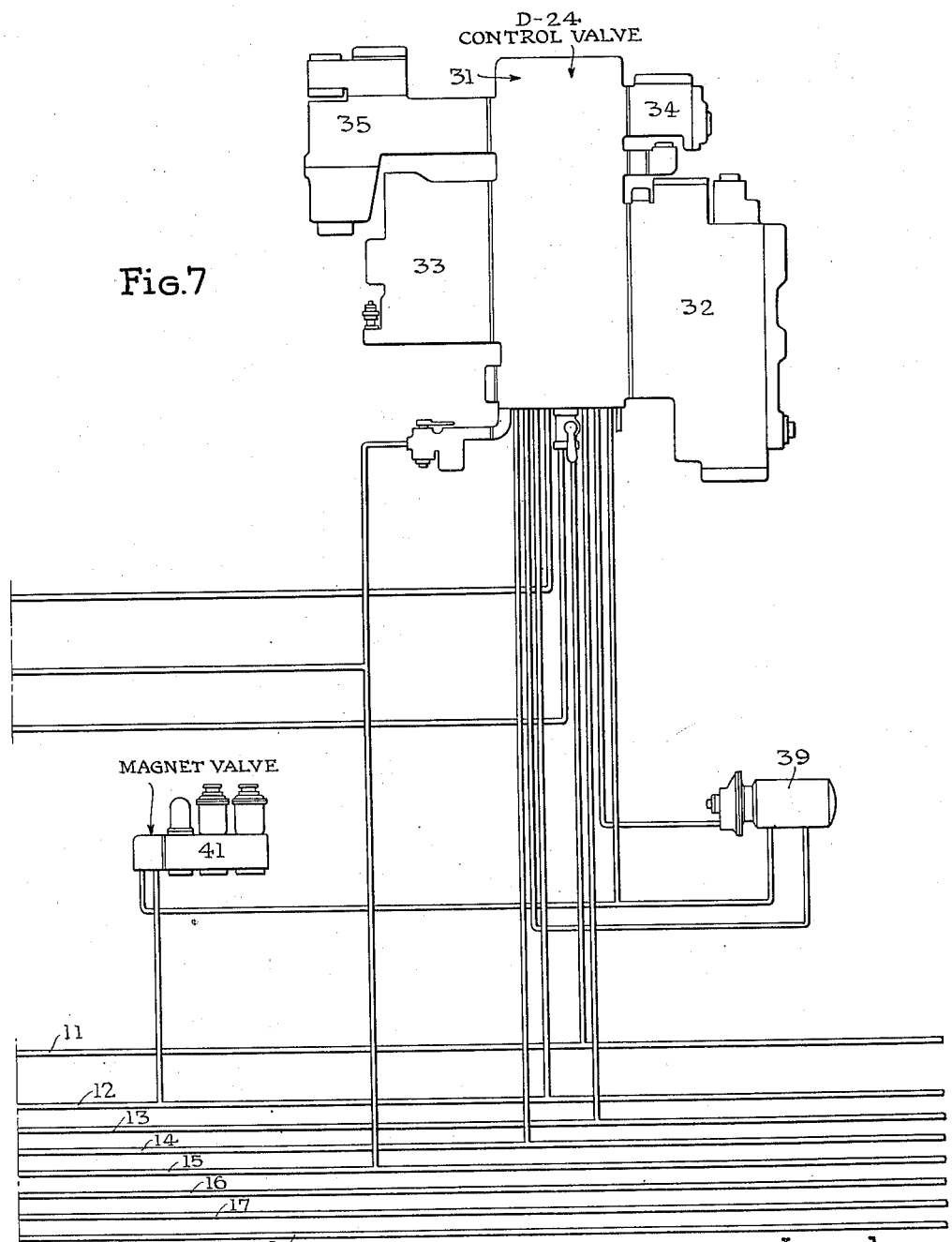

Except for hose connections, Figs. 1, 2 and 3 comprise the leading unit of the locomotive, Figs. 4 and 5 the second unit and Figs. 6 and 7 the third unit. The second and third units are identical. More than two such units may be connected behind a leading unit. The invention does not in any way limit available uses of any of the units.

The pipes which extend from end to end of the locomotive are the controlled emergency pipe 11, the straight air pipe 12, the independent application and release pipe 13, the actuating pipe 14, the automatic brake pipe 15, the main reservoir pipe 16 and the signal pipe 17. The brake cylinder pipe 18 is not connected between units but each section thereof serves as a manifold connection for the various brake cylinders on the corresponding unit. The brake cylinders are conventional and are not illustrated.

The engineer's brake valve is generally indicated at 21. It is connected with the main reservoir branch 22, the automatic brake pipe 15 and the master controller 23. This is an electropneumatic relay for controlling pressure in the straight air pipe 12, to which the controller is connected by branch line 24.

The relay air valve 25 includes a cut-off valve portion 26, an overspeed suppression valve portion 27 and an overspeed application valve portion 28. The overspeed magnet valve is shown at 29. The functions of these components are not involved in the invention. They are shown to avoid simplifying the diagram beyond recognition.

Each unit of the locomotive carries a control valve 31 (type D–24 is indicated) and this includes a service portion 32, emergency portion 33, controlled emergency portion 34 and independent application and release portion 35. The control valve is connected as indicated with pipes 22, 11, 12, 13, 14 and 15. It controls pressure in the brake cylinder connection 18 by controlling the operation of relay 36 to which the control valve is connected by pipe 48. Relay 36 is connected by branch pipe 37 with main reservoir branch 22, and by branch pipe 38 with brake cylinder connection 18 on the corresponding unit. The combined reservoir for the control valve is diagrammed at 39, and the magnet valve at 41.

As shown in Figs. 4 and 5 for the second unit and Figs. 6 and 7 for the third unit, each of these units is equipped with a control valve as above described, a combined reservoir, a relay valve and a magnet valve, the connections being basically the same as those on the leading unit.

On the leading unit there is an independent brake valve indicated at 42. This includes a rotary vertical spindle 43 which may be turned on its axis by a handle 44 and when so turned actuates a self-lapping valve device generally indicated at 45 to establish in the independent application and release pipe 13 pressures which are determined by the position to which the handle is rotated.

The self-lapping mechanism 45 is actuated by a cam 46 on the stem 43. The independent brake valve is a standard and well-known device and requires no further description so far as the present invention is concerned.

Hinged to the housing of the independent brake valve 42 is a bail 47 which may be depressed by depressing the handle 44 about the pivot 48 which connects the handle to the spindle 43. Depression of the handle 44 and the bail 47 shifts a double beat poppet valve 49. When this valve is in its normal upward position, it connects a branch of the actuating pipe 14 with the atmospheric port 51. When the valve is shifted downward, this exhaust connection from pipe 14 is closed and the pipe is connected with the main reservoir branch 22. Thus, when the handle 44 is depressed, the actuating pipe 14 is charged.

As best shown in Fig. 3 the actuating pipe leads to the space below the release piston 52 located in the independent application and release portion 35 of each of the control valves 31. If the handle 44 is held down while an application is made by manipulation of the engineer's brake valve 21, the release pistons 52 function to prevent the brakes from applying on the locomotive. This action has no effect on the application which occurs on the cars of the train.

Commercial independent brake valves such as the valve 42 are provided with means for latching the handle 44 in its depressed position but it is impracticable to illustrate that mechanism in Fig. 2 and strictly its function is not involved in the present invention. If the brakes are applied by operating the engineer's brake valve 21 while the handle 44 of the independent brake valve remains in its upper position, the brakes on the locomotive units apply at the same time that the brakes apply on the train. If the engineer then wishes to release the locomotive brakes without releasing the train brakes, he depresses the handle 44 and holds it down until all the release pistons 52 have shifted and caused release of all the brakes on the locomotive.

All the structure and all the functions so far described are standard in this art and are simply the background for the present invention. Practical use of brake systems such as that described have met with the difficulty that the engineer has no way of knowing whether the release pistons 52 have responded properly on the trailing units. Instances have occurred where serious damage has been done by unconscious and unduly long applications of locomotive brakes on one or more trailing units. This invention provides a signal which will respond if any one of the brake cylinder pipes 18 is under pressure at a time when the actuating pipe 14 is vented.

On the leading unit a small signal whistle 53 is connected with the pipe 14 and is so designed that it will operate as a constant vent of the pipe 14 regardless of the position of the valve 49. This whistle will blow at least at those times when the pipe 14 is subject to a slight positive pressure. It may blow whenever the pipe is subjected to any pressure but that point is not here important. Moreover, the whistle 53 is simply typical of any signal observable by the engineer and capable of responding to a slight outflow of air from the pipe 14.

Each unit of the locomotive and, in the drawings this means the leading unit and each of the two trailing units, is provided with means for supplying air at a restricted rate to the actuating pipe 14 when the brakes are applied. A diaphragm operated valve unit 54 includes a motor diaphragm 55 and a biasing spring 56 so arranged that the spring holds the valve 57 closed and the diaphragm 55 acts to open the valve against the resistance of the spring whenever the brake cylinder pipe 18 on that particular unit is under pressure.

The valve 57 controls flow from the pipe 22 which is at main reservoir pressure through a choke 58 of small flow capacity. In the simplest possible embodiment of the invention air passes the choke 58 and flows directly into the actuating pipe 14 and the rate of flow, determined by the capacity of the choke 58, is such as to assure operation of the signal, for example the whistle 53, without developing sufficient pressure in the pipe 14 to affect any of the release pistons 52.

With this simple arrangement if the engineer depressed the handle 44, he would charge the pipe 14 and actuate the release pistons 52. If all the pistons operated and the brakes released, the whistle 53 would not blow after the pipe 14 was properly vented by the rise of the handle 44 but if any brake remains still applied, air would be fed to the pipe 14 at a rate sufficient to blow the whistle 53 and its continued operation would tell the engineer that his depression of the handle 44 had not effected a complete release.

The independent brake valve is used to hold the locomotive when standing in a station. When the brakes are applied by the independent brake valve, the application and release pipe 13 is under pressure. It is desirable to prevent the signal 53 from operating under the conditions just mentioned and consequently a valve unit 61 is interposed between the choke 58 and the actuating pipe 14. This comprises a valve element 62 biased to open position by a spring 63 and arranged to be closed by pressure acting on a diaphragm 64. The space above the diaphragm 64 is connected to the application and release pipe 13 by a branch as best shown in Figs. 3 and 4. This is simply an inhibiting device which prevents the signal from operating at times when the independent application and release pipe is under pressure.

The valve 57, choke 58 and valve 62 are arranged in series so that both valves have to be open when flow occurs. When it occurs, it is controlled by the choke. Any arrangement which will bring about this result meets the requirements of the situation. A series arrangement is the simplest possible. The order in which the two valves and the choke are arranged is obviously immaterial.

The invention provides an extremely simple accessory for an existing brake system. Its function is to sound a warning whenever a release of locomotive brakes has not been completed. The apparatus in the form illustrated comprises two diaphragm valves, one of which is normally open and the other normally closed, a choke for controlling the flow through those valves and a signal capable of being operated by air flowing through said choke.

Since the brake cylinder connections are individual to the various units of the locomotive, the diaphragm operated valve mechanisms are mounted one on each of the locomotive units including the leading unit as well as the trailing units. The particular value of the scheme is that it makes use of pipes which already exist in the system without impairment of their normal functions.

In addition, a moderate advantage arises from the fact that whenever a brake application is made on the locomotive by means other than the application and release pipe 13, the actuating pipe will be partially charged on each of the locomotive units but at a rate insufficient to affect any of the release pistons 52. This charge levels off in the actuating pipe and has no effect except possibly the operation of the signal whistle 53. If then the engineer releases the brake by depressing the handle 44, he starts with a partial charge in the actuating pipe 14. As a consequence release is effected with greater certainty and promptness.

I claim:

1. In an air brake system for use in multiple-unit locomotives, the combination of a source of air under pressure; a brake cylinder connection which is under pressure when the brakes are applied; selective brake releasing means comprising an actuating pipe and at least one release motor operable by pressure on the actuating pipe to effect an independent release of locomotive brakes; means operable selectively to vent and to charge said actuating pipe; signal means including a restricted vent leading from said actuating pipe and an indicator responsive to outflow therethrough; and pressure responsive means rendered active by the existence of pressure in said brake cylinder connection and when active serving to feed air from said source to said actuating pipe at a restricted rate sufficient to cause response of said indicator but insufficient to overcome the pressure dissipating effect of said restricted vent.

2. The combination defined in claim 1 in which the system includes an independent application and release pipe and means serving in response to the existence of pressure therein to suspend the feeding action of said pressure-responsive means.

3. The combination defined in claim 1 in which the system is of the combined straight-air automatic type including a straight air pipe, an automatic brake pipe and control valves and relays at times controlled by pressure changes in said pipes, and the releasing motors are in the form of release pistons operatively associated with respective control valves.

4. A brake system for multiple-unit locomotives comprising in combination a source of air under pressure; an engineer's brake valve in the leading unit connected with said source; control valves on respective units each such valve having an independent release portion including a release motor; brake cylinder connections on the various units, each such connection being under pneumatic pressure when the brakes on the corresponding unit are applied; brake pipe means functionally relating said control valves with said engineer's brake valve; a normally vented actuating pipe connected with the various release motors; manually operable means on the leading unit for temporarily connecting the actuating pipe with said source and so charging the pipe to operate said release motors; a signal device operatively related to said actuating pipe and operable while the pipe is vented by air delivered to the pipe at a rate insufficient to operate said release motors; and normally closed pressure responsive valves each subject to pressure on the brake cylinder connection of the corresponding unit and each effective when said connection is under pressure to deliver air under pressure at said insufficient rate to the actuating pipe.

5. The combination defined in claim 4 in which the system includes an independent brake valve on the leading unit; an application and release pipe which is charged and vented by said independent release valve and is connected with said control valves; and means serving in response to the existence of pressure in said application and release pipe to suspend the air-delivering function of said pressure-responsive valves.

6. The combination defined in claim 4 in which the system includes an independent brake valve device having an actuator movable about two axes and two valve means operable selectively thereby, one of which is said means for temporarily connecting said actuating pipe with the source of air and the other is the independent brake valve proper; an application and release pipe charged and vented by the application and release valve proper and connected with said control valves; and means serving in response to the existence of pressure in said application and release pipe to suspend the air delivering function of said pressure-responsive valves.

7. A brake system for multiple-unit locomotives comprising in combination a source of air under pressure; an engineer's brake valve in the leading unit connected with said source; control valves on respective units each such valve having an independent release portion including a release motor; brake cylinder connections on the various units, each such connection being under pneumatic pressure when the brakes on the corresponding unit are applied; brake pipe means functionally relating said control valves with said engineer's brake valve; an independent brake valve device having an actuator movable about two axes and two valve means operable selectively thereby one of which is an actuator valve and the other of which is the independent release valve proper; a normally vented actuating pipe connected with said release motors and adapted to be charged by operation of said actuator valve; an application and release pipe connected with said control valve and adapted to be controlled by said independent release valve proper; a signal device operatively related to said actuating pipe and operable while the pipe is vented by air delivered to the pipe at a rate insufficient to operate said release motors; and pressure responsive valve means for supplying air to said actuating pipe at said insufficient rate and responsive to pressures in the brake pipe connection and in the application and release pipe in such relation as to inhibit said flow except when concurrently the brake pipe connection is under pressure and the application and release pipe is vented.

8. In an air brake system for use in multiple-unit locomotives, the combination of a source of air under pressure; a brake cylinder connection which is under pressure whenever the brakes are applied; an application and release pipe which is normally vented, but is charged during an independent application; an actuating pipe; an independent brake valve capable of controlling pressure in the application and release pipe, connected with said actuating pipe and capable of an independent manipulation by which it is caused to vent and charge the actuating pipe; signal means including a restricted vent leading from said actuating pipe and an indicator responsive to outflow therethrough; and two pressure responsive valves and a flow restrictor connected in series to control flow through the restrictor from said source to the actuating pipe one of said valves being normally biased closed and arranged to open in response to pressure in the brake cylinder connection, and the other being normally biased open and arranged to close in response to a positive pressure in said application and release pipe.

9. The combination defined in claim 8 in which said pipes extend continuously through at least two locomotive units one of which is a leading unit, the independent brake valve is located on said leading unit, and a pair of pressure-responsive valves with flow-restrictor is located on each trailing unit and respond to pressure conditions in components on respective units.

JOHN VAN VARICK ELSWORTH.

REFERENCES CITED

The following references are of record in the file of this patent:

UNITED STATES PATENTS

| Number | Name | Date |
|---|---|---|
| 2,403,938 | Macan | July 16, 1946 |
| 2,464,978 | Hines | Mar. 22, 1949 |
| 2,491,344 | Vroman | Dec. 13, 1949 |